Sept. 4, 1934.   S. M. UDALE   1,972,251
BRAKE DRUM
Filed Aug. 4, 1930
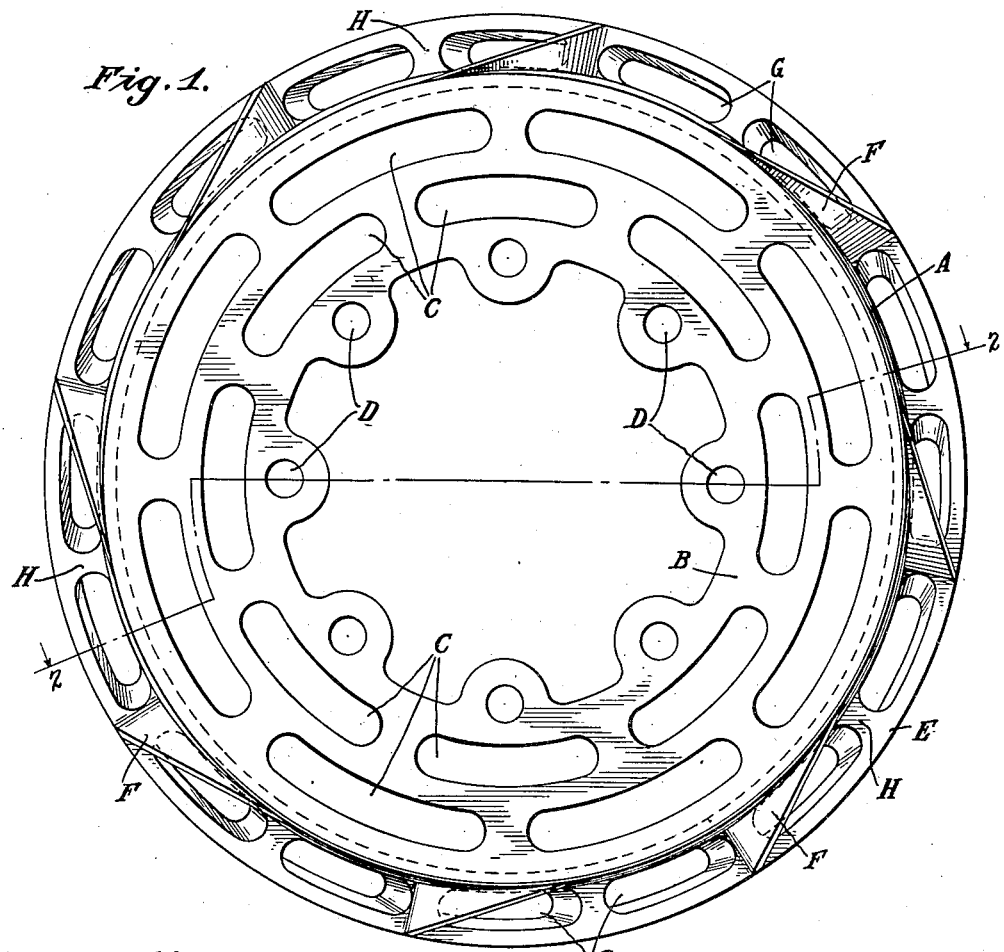
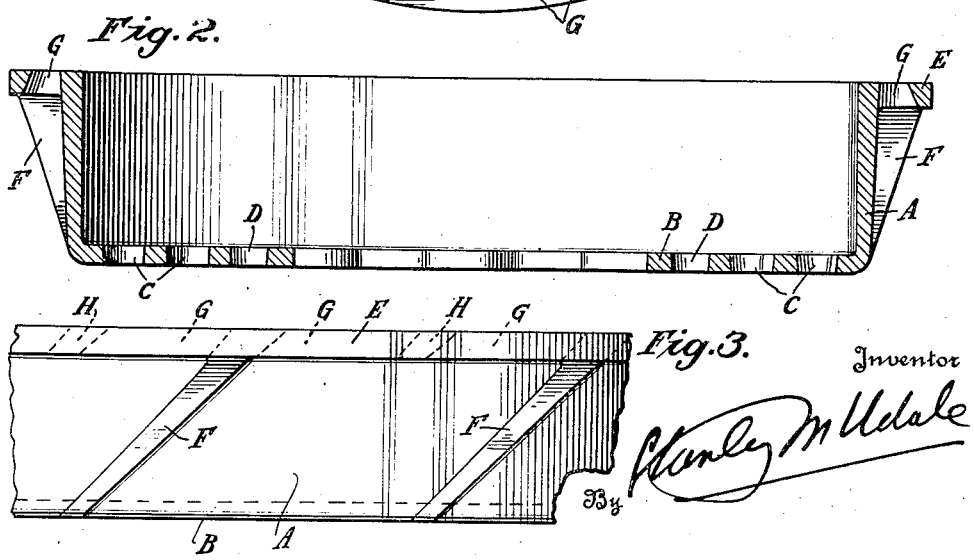

Patented Sept. 4, 1934

1,972,251

UNITED STATES PATENT OFFICE 1,972,251

BRAKE DRUM

Stanley M. Udale, Detroit, Mich., assignor, by mesne assignments, to Erb-Joyce Foundry Company, Detroit, Mich., a corporation of Michigan Application August 4, 1930, Serial No. 473,059

3 Claims. (Cl. 188—218)

This invention relates to brake drums.

The object of this invention is to provide means whereby the brake drum may be held firmly in place and yet permit the wearing surface to expand and contract freely.

An additional object of this invention is to prevent the wearing surface from overheating.

In the drawing:

Figure 1 shows the brake drum in elevation;

Figure 2 shows a sectional plane view taken on the broken plane 2—2 of Figure 1; and Figure 3 shows the outside elevation looking down on Figure 1.

In the figures, A is a cylindrical brake ring providing wearing surface; B is the inwardly directed attaching flange or web which is perforated at CC and provided with holes DD through which the attaching bolts pass; E indicates an outwardly directed flange or stiffening rib on the outer end of the cylinder A; FF are reenforcing ribs which also act to direct air against the rib E. This rib E is perforated at G, there being portions H left therebetween intermediate the ribs FF.

Operation

When the brake drum is in operation, the cylindrical portion A expands. The retaining bolts that pass through the holes DD have a fixed location. Therefore, the web B is stretched, the perforation CC, being radially offset from each other, enabling it to yield slightly, so as not to impose any undue strain on the cylinder A. The webs FF being located at 45 degrees to direct air through the holes GG in the stiffening rib E, the effect of this is two-fold; the air cools the cylinder A, thereby preventing undue expansion; and secondly, the rib E is cooled to such an extent that it acts as a restraining element preventing the cylinder A taking the form of a cone.

It is obvious that although the drum is illustrated as a casting, the drum can be reproduced without the cooling fins and with the perforated web B in ordinary soft steel stamping stock. The construction shown is preferred because cast iron is superior to soft steel as a brake drum material.

What I claim as my invention is:

1. A brake drum including a ring providing a cylindrical braking surface on its inner face, an integral radially outwardly directed flange at one end thereof provided with openings therethrough, and webs integral with said ring and flange and helically disposed with respect to said ring.

2. A brake drum including a ring providing a cylindrical braking surface on its inner face, an integral radially outwardly directed flange at one end thereof provided with openings therethrough, and webs integral with said ring and flange and helically disposed with respect to said ring, said webs varying in height across the outer face of said ring.

3. A brake drum including a ring providing a cylindrical braking surface on its inner face, an integral radially outwardly directed flange at one end thereof provided with openings therethrough, and webs integral with said ring and flange and helically disposed with respect to said ring, said webs tapering in height across the outer face of said ring from a maximum at said flange.

STANLEY M. UDALE.